Nov. 23, 1965  C. H. WORSHAM  3,219,562
ELECTROLYTIC PROCESS FOR PRODUCING KETONES
Filed July 3, 1961  2 Sheets-Sheet 1

CHARLES H. WORSHAM INVENTOR

BY *Olin B. Johnson*

PATENT ATTORNEY

United States Patent Office 3,219,562
Patented Nov. 23, 1965

3,219,562
ELECTROLYTIC PROCESS FOR PRODUCING KETONES
Charles H. Worsham, Fanwood, N.J., assignor to Esso Research and Engineering Company, a corporation of Delaware
Filed July 3, 1961, Ser. No. 121,488
6 Claims. (Cl. 204—79)

This application is a continuation-in-part of application Serial No. 26,190, filed May 2, 1960 and Serial No. 80,193, filed January 3, 1961, both now abandoned.

This invention relates to a novel process for converting an olefin to the corresponding ketone. In particular, it relates to contacting an olefin with sulfuric acid and converting such olefin to the corresponding ketone in a single phase process utilizing electrochemical oxidation. More particularly, it relates to a process wherein an olefin is passed into solution with aqueous sulfuric acid and converted in situ to the corresponding ketone via anodic oxidation.

Ketones are produced commercially by catalytic dehydrogenation of the corresponding secondary alcohol. Ordinarily, the secondary alcohol feedstock is produced by sulfuric acid hydration of the corresponding olefin. Thus, where the ketone is derived from an olefin, two separate processes with intermediate product recovery are employed. In the first such process, i.e., for alcohol production, the olefin is absorbed into a concentrated sulfuric acid solution resulting in the formation of an organic sulfate which, in turn, is hydrolyzed to the corresponding secondary alcohol. The alcohol is separated from the acid solution and purified by conventional separation techniques usually involving a series of distillations and caustic washings. In the second process, i.e., for ketone production, a highly refined alchol, e.g., above about 99% purity, is passed in vapor phase over a solid catalyst at elevated temperatures in the range of about 650° F. to 900° F. to dehydrogenate the alcohol feedstock to the corresponding ketone. The crude ketone product is then subjected to a series of product recovery steps, the second such series in the over-all process. The two-stage ketone processes of the type described are well known in the art and are exemplified by the process for producing secondary butyl alcohol from n-butenes disclosed in U.S. Patent 2,514,291 and the process for converting secondary butyl alcohol to methyl ethyl ketone in U.S. Patent 2,835,706.

The problems inherent in conventional two-stage production of ketones include the necessity for separation, recovery and finishing of both an intermediate and an end product, the complexity and duplication of processing apparatus and equipment, and the need for large-scale acid reconcentration.

It has now been discovered that ketones can be selectively produced from the corresponding olefins by contacting the original feedstock with aqueous sulfuric acid and subjecting the resulting solution to anodic oxidation.

Direct conversion of chemical energy of hydrogen or an organic compound to electrical energy via electrochemical oxidation is known in the art and a device wherein such conversion is accomplished has become commonly known as a fuel cell. The general use of such cells to produce electrical energy and organic chemical products simultaneously is disclosed in my aforementioned copending application Serial No. 26,190. Anodic oxidation of an organic compound in a power-consuming cell which receives electrical energy from an external source is also known in the art and such cells are referred to as electrolytic cells or electrolytic reactors. Hydrogen is evolved at the cathode of such cells from the aqueous electrolyte.

The anodic oxidation step of the instant process may be carried out in either a fuel cell type of electrochemical reactor with simultaneous generation of electrical energy or in an electrolytic cell or reactor with a net consumption of electrical energy which must be supplied from an external source. In both types of reactors the organic feedstock to be converted is brought into dual contact with an aqueous sulfuric acid electrolyte and an anode of the cell. In the fuel cell the reaction is initiated by the admission of oxygen gas into dual contact with a cathode and the electrolyte which results in a catalyzed reduction of such oxygen, i.e., acceptance of electrons, and the formation of water thereafter with hydrogen ions in the electrolyte. Conducting means are provided between anode and cathode external to the electrolyte providing a net flow of electrons to the cathode after reaction is initiated. In the electrolytic cell the reaction is initiated by admitting a direct current to the cathode.

The anodic half-cell reaction, although requiring a complementary cathodic half-cell, is essentially independent of the cathodic half-cell reaction under the conditions of reaction employed in accordance with this invention. Thus the electrochemical reaction of the instant process whereby ketones are produced may be referred to simply as anodic oxidation without differentiation as to the activation of the cathodic half-cell reaction. Likewise, the cell employed herein may be referred to as an electrochemical reactor, it being understood such term herein defines a class of cells which include both a power-generating fuel cell and a power-consuming, hydrogen-evolving, electrolytic cell.

The absorption of normal olefins, hereinafter referred to as n-olefins, in sulfuric acid with subsequent hydrolysis to form the corresponding secondary alcohol is known in the art. The conversion of such alcohols electrochemically to the corresponding ketone in a fuel cell is disclosed in my aforementioned copending application Serial No. 80,193. Thus, where such alcohols form in the instant process, they are convertible to corresponding ketone. However, the mechanism of reaction in the instant process is not fully understood. Thus it is not known whether complete formation of an alcohol intermediate is a true condition precedent to ketone formation in this process. I, therefore, do not wish to be bound by any single theory of reaction mechanism herein.

It is one object of this invention to provide a highly selective process wherein an olefin is contacted with an aqueous sulfuric acid solution, the acid solution employed as the electrolyte of an electrochemical reactor, and the absorbed olefin and/or a hydration derivative thereof converted to the corresponding ketone.

It is another object of this invention to provide a process for producing a ketone directly, using such term in a physical sense, from the corresponding olefin, i.e., without intermediate product separation.

It is another object of this invention to provide a process for the simultaneous production of a ketone and electrical energy in a fuel cell system from an olefin comprising feedstock in an acid medium.

It is a further object of this invention to provide a process for the simultaneous production of a ketone and pressurized hydrogen gas of high purity in an electrolytic cell from an olefin comprising feedstock in an acid medium.

It is a further object of this invention to provide a process whereby an olefin may be converted to the corresponding ketone in a single stage process while maintaining an essentially common acid strength throughout.

It is a still further object of this invention to provide a process wherein ketones are produced from n-olefins contained in a hydrocarbon mixture which also contains isoolefins by selectively extracting such isoolefins from such mixture and sending such n-olefins directly to the sulfuric acid electrolyte of an electrochemical reactor as a gas.

These and other advantages, objects, and features of the invention will become apparent from the following description and drawings.

Figure 1:
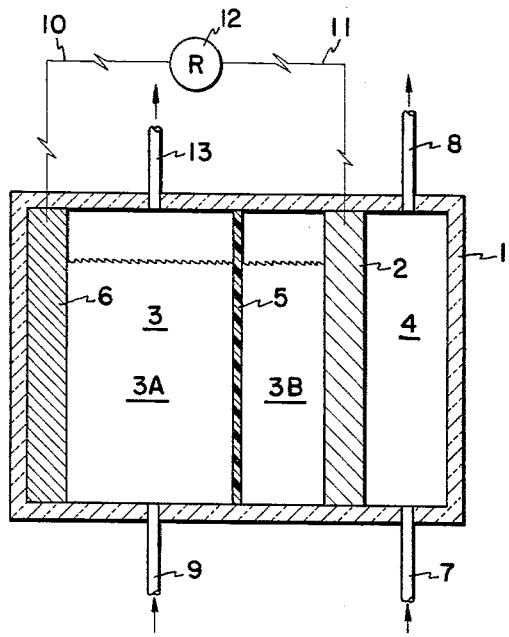
FIGURE 1 is a schematic side view of a simplified fuel cell which may be utilized as an electrochemical reactor for carrying out one embodiment of this invention.

In FIGURE 1 there is shown a vessel 1 containing an aqueous sulfuric acid electrolyte. This electrolyte may contain from about 0.5 to 12, preferably 2.5 to 10.5, mole $H_2SO_4$/liter. Vessel 1, as shown, is constructed of glass or porcelain but may be of any acid resistant material which does not interfere with the electrochemical reactions hereinbefore described. Where the vessel is constructed of stainless steel or other conductive material, insulation in accordance with conventional electrical circuitry would be employed to avoid short-circuiting between the electrodes. Cathode 2 divides vessel 1 into an electrolyte zone 3 and an oxygen receiving compartment 4. Compartment 3 is here shown divided into an anolyte compartment 3A and a catholyte compartment 3B by an electrolyte divider 5. This divider may be an ion-exchange membrane, a porous glass plate or other means admitting of ion transfer but suitable for retaining in the anolyte, a major portion of the organic materials admitted to compartment 3A, e.g., olefins and their reaction products. Divider 5 is not essential to the process but improves reaction rate if the cathode employed is adversely affected by contact with the organic reactant. Cathode 2 is a porous carbon plate impregnated with a platinum comprising catalyst, e.g., 95% platinum and 5% gold. The larger pores of this electrode are coated with a suitable wetproofing agent, such as polytetrafluoroethylene. Within anolyte compartment 3A is positioned anode 6, an acid resistant metal sheet surfaced with a coating of platinum black. The practice of this invention is not restricted to the use of any particular electrode structure at either the cathode or anode. Both electrodes must be of acid resistant materials. It is preferred to employ at each electrode a platinum comprising catalyst which may be platinum alone or an alloy, or mixture of platinum with other metals, particularly gold and/or iridium. In such mixtures platinum is the major component by weight while the other metal or combination of other metals constitutes a minor component by weight, e.g., about 1 to 10%. However, it is within the scope of this invention to employ any of the acid resistant fuel cell catalysts known to the art for use in the reduction of oxygen at the cathode or oxidation of an organic compound at the anode.

In one embodiment of the invention air is passed into oxygen receiving compartment 4 via conduit 7 in an amount preferably in the range of about 50 to 200% of the stoichiometric requirements of the fuel cell reaction. Oxygen diffuses through porous cathode 2 and forms with the electrolyte and cathode 2 a three-phase contact or interface. Excess air, oxygen, depleted air and absorbed water vapor is exhausted from compartment 4 via conduit 8. A n-olefin, e.g., butene-1, is admitted to the anolyte via conduit 9 as a gas and absorbed by the sulfuric acid therein. The resulting solution containing the hydration products of such union of acid and olefin is brought into contact with anode 6 where a ketone, in this case methyl ethyl ketone, is formed. When oxygen is in contact with the electrolyte at the reaction sites on cathode 2, the olefin-acid comprising solution is in contact with the reaction sites on anode 6, the temperature and pressure of the electrolyte is within the operating ranges hereinafter set forth, and means are provided for an electron flow from anode 6 to cathode 2, all conditions requisite to the desired fuel cell reaction are brought together and the process of this invention is self-activating. Wires 10 and 11 are conductors from electrodes 2 and 6, respectively, and together with a resistance means 12 complete the electrical circuit. Resistance means 12 may be any power-consuming device for utilizing the electrical output of this process and, if desired, may be nothing more than the conductor establishing electrical connection between the electrodes.

In this embodiment the cell may be operated so as to remove the ketone overhead via conduit 13 at a temperature sufficient to give a significant vapor pressure of the ketone above the electrolyte. The product in conduit 13 together with other vapors carried overhead from the cell is passed to a product recovery zone for separation and purification external to reactor vessel 1. However, it is to be understood that the process may be carried out so as to remove the ketone as a liquid by continuously withdrawing electrolyte, separating product and recycling the electrolyte to the reactor. It is also within the scope of this invention to absorb the olefin in the electrolyte outside the cell, introducing both in a common stream. It is within the scope of this invention to channel the product recovery stream from a large number of cells to a common recovery unit.

It is further to be understood that although the reactor of FIGURE 1 is an operable device for practicing this invention, it is a greatly simplified adaptation of apparatus that would be used for large-scale production and that a large number of such cells may be connected either in bipolar or unipolar arrangement in series and/or parallel to provide an industrial reaction unit. The cell designs and cell combinations referred to are known in the art and do not comprise a part of this invention which is concerned with the process described and claimed.

Figure 2:
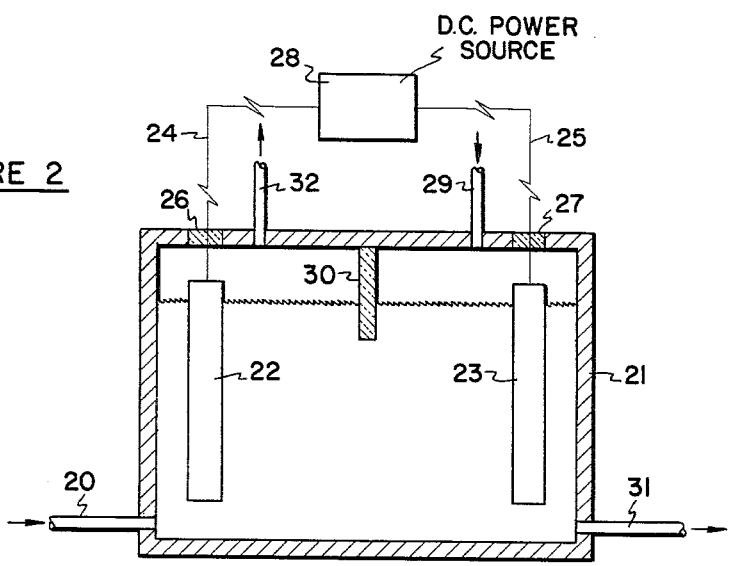
FIGURE 2 is a schematic side view of a simplified electrolytic cell which may be utilized as an electrochemical reactor for carrying out another embodiment of the instant invention.

In FIGURE 2 a power-driven electrolytic cell is utilized for a different embodiment wherein an olefin absorbed stream of aqueous sulfuric acid is admitted to reaction vessel 21 via conduit 20. In the alternative, the olefin may be admitted to electrolyte with 21 as a gas via conduit 20. The electrolyte concentrations applicable for use in the fuel cell aforedescribed are equally applicable to this reactor. Positioned within vessel 21 are anode 22 and cathode 23 comprising metal sheets upon which has been electrodeposited a coating of platinum black. Electrodes 22 and 23 are connected with wires 24 and 25, respectively. Wires 24 and 25 pass out of vessel 21 through insulators 26 and 27, respectively, and are connected with a direct current electrical power source 28. Power source 28 may be any source of direct electric current, e.g., storage battery, power-producing fuel cell pack, rectified alternating current, etc. Electrical energy, e.g., with a potential of about 0.5 to about 1.65 volts, is admitted to cathode 23 from power source 28 and the conversion of the absorbed olefin to ketone, as hereinbefore described, is initiated at anode 22. When electrical energy is admitted to cathode 23, as before mentioned, hydrogen gas is evolved from the electrolyte solution (aqueous $H_2SO_4$) at cathode 23 and such gas exits from the cell via conduit 29. A pressure control valve may be associated with conduit 29 providing means for utilizing the hydrogen evolved to pressurize the reactor and to permit recovery of high pressure hydrogen. Baffle 30 is positioned across the top of the reactor so as to extend below the upper surface of the liquid electrolyte-reaction mixture or solution. Baffle 30 is so positioned to prevent any appreciable transfer of hydrogen evolved at cathode 23 to anode 22 where it would react electrochemically. A side stream comprising ketone, secondary alcohol, the corresponding organic sulfate, olefin and sulfuric acid is removed continuously from reaction vessel 21 via conduit 31 and passed to a product recovery unit. As in the fuel cell, reactor product may be recovered overhead as a gas when the product and the conditions employed make that possible. Product recovery may be effected by distillation, extraction and other conventional liquid separation techniques. The acid, olefin, sulfate and secondary alcohol may be recycled to the cell after separation of the ketone. It is to be understood that the apparatus and processes described may be modified in accordance with accepted engineering practices within the overall scope of the invention as herein described.

Figure 3:
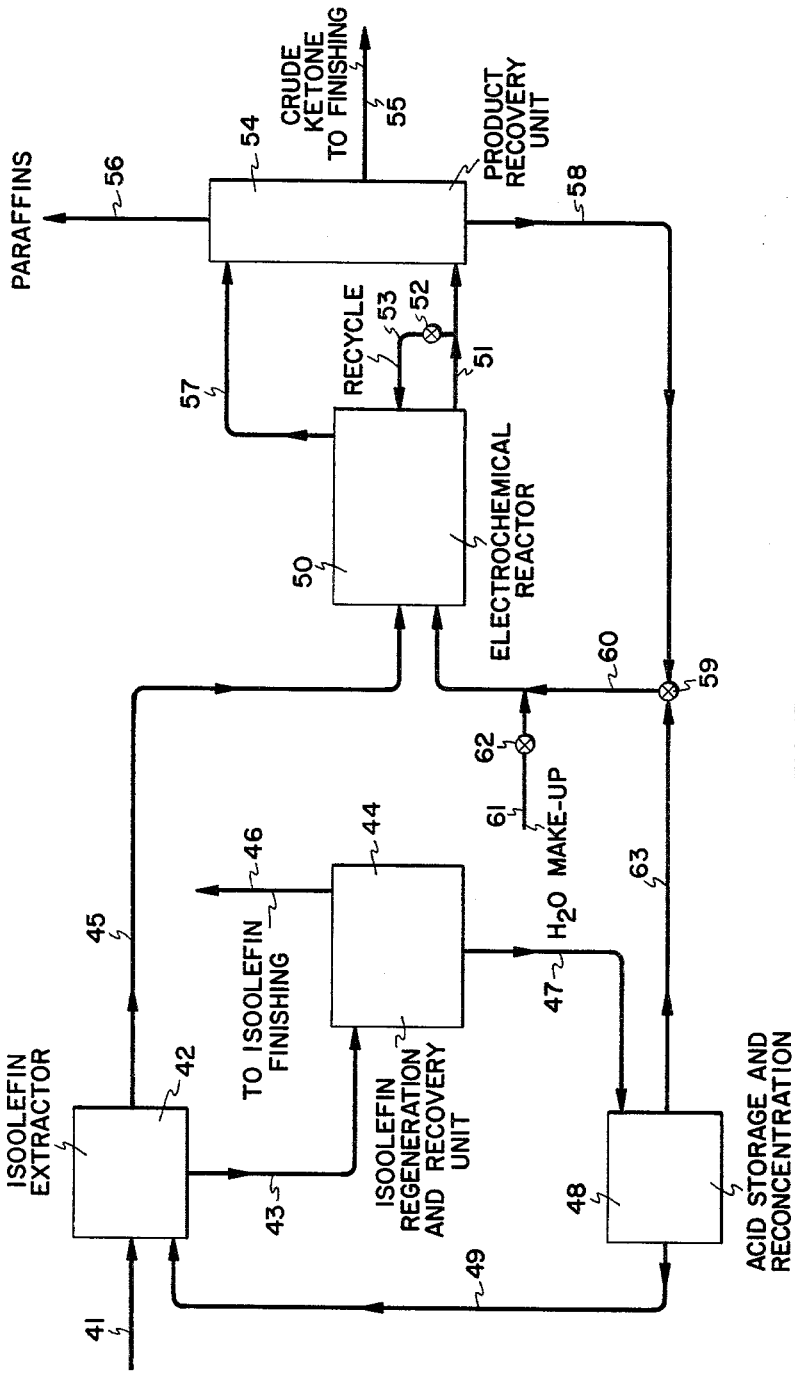
FIGURE 3 is a schematic flowplan illustrating processing of a mixed hydrocarbon stream in the production of ketones in accordance with this invention.

Referring to FIGURE 3, a refinery stream comprising a mixture of hydrocarbons containing isoolefins and n-olefins is passed via conduit 41 to isoolefin extractor 42. This stream ordinarily will consist essentially of hydrocarbons having the same number of carbon atoms per molecule, e.g., a mixed $C_4$ stream containing isobutylene, n-butylenes, n-butane and isobutane. Hydrocarbon streams containing both n-olefins and aromatics preferably should be pretreated, e.g., with a selective solvent such as phenol, to remove the aromatics before carrying out the instant process. When minor amounts of hydrocarbons of different carbon number are present in the feedstock, their concentration should be minimized so far as the economics of separation permit. The isoolefin extractor 42 comprises one or more, normally three, reactors or mixers each followed by an emulsion settler, an emulsion circulation pump and coolers. Alternately the isoolefin may be extracted from the mixed hydrocarbon stream in a countercurrent operation employing a packed tower. These subunits are not individually shown in the drawings as conventional equipment now employed for isoolefin separation in industrial alcohol plants can be used and the techniques employed for this extraction step are well known in the art. In this unit the hydrocarbon mixture is contacted in liquid phase with 60 to 70, preferably 63 to 68 and most commonly about 65, wt. percent sulfuric acid to extract the isoolefin. This extraction is preferably carried out at about 70° F. to 110° F. to yield an isoolefin acid extract. In the case of a $C_4$ stream an extract is removed containing about 1.3 to 1.4 moles of isobutylene/mole of $H_2SO_4$ and the extraction is carried out in stages at temperatures in the range of 70° F. to 100° F. Contact of the hydrocarbon mixture with such acid includes countercurrent flow and/or jet mixing. The reaction of an isoolefin with sulfuric acid is much faster than that of the corresponding n-olefin under these conditions. Holdup time in isoolefin extractor 42 can therefore be terminated before any appreciable quantity of n-olefins is absorbed. The isoolefin-acid extract is removed from isoolefin extractor 42 via conduit 43 and passed to isoolefin regeneration and recovery unit 44, while the unabsorbed remainder of the mixed hydrocarbon stream, i.e., n-olefins and paraffins, is passed as via conduit 45 to electrochemical reactor 50. This stream may be vaporized in a separate subunit of extractor 42 or at any point between extractor 42 and reactor 50.

Regeneration unit 44 ordinarily will comprise a degassing drum and a regenerator tower which are not individually shown in the drawing. The isoolefin-acid extract is normally heated by the injection of steam and passed to the degassing drum to flash off paraffins which take with them some olefins. The degassed extract is then pumped to the regenerator tower where water is injected into the top of such tower to control the top temperature while a steam spray is admitted at the bottom thereof to maintain a temperature of about 250° F. An overhead stream from regeneration unit 44 is passed via conduit 46 to an isoolefin finishing unit, not shown. The sulfuric acid in regeneration unit 44 is diluted in the recovery of isoolefins to about 45 wt. percent and this diluted acid is passed via conduit 47 to acid reconcentration unit 48 where it is reconcentrated by means well known in the art, e.g., distillation, to about 60 to 70 wt. percent. Reconcentrated acid may be recycled via conduit 49 to isoolefin extractor 42 or passed via conduit 63, valve 59, and conduit 60 to electrochemical reactor 50 for use as electrolyte therein. Electrochemical reactor 50 comprises at least one, and preferably a plurality of fuel cells or electrolytic cells as hereinbefore described. These cells may be connected in series and/or parallel. Each individual cell in such reactor comprises an anode and a cathode as hereinbefore described which are spaced apart with a sulfuric acid electrolyte providing means for ion transfer between such electrode. The cell packs may be constructed so as to connect cells to each other by either simple unipolar connection between anode and cathode or bipolar connection for series connection wherein conduction is provide from one electrode of one cell to the opposite electrode of another with single terminal conductors at opposite ends of the cell pack forming the terminal leads for an external circuit. The cathode of the fuel cell will preferably comprise a porous acid resistant structure through which oxygen can diffuse to contact the electrolyte, e.g., porous carbon impregnated with an acid resistant metal catalyst, a porous organic membrane that is acid resistant and which has been surfaced with a continuous layer of acid resistant metal to serve as both the electrode conductor and catalyst, or porous metal structures suitably designed. The cathode of the electrolytic cell need only be of an acid resistant material which is a good electron conductor and may take the form of a metal sheet or grid. It may be coated with a suitable catalytic salt or metal to reduce the voltage required for the cathodic process in a manner well known in the art. The anode requirements are the same for both the fuel cell and the electrolytic cell. Since the reactant feed is soluble in the electrolyte there is no necessity to employ a porous or diffusion type anode to bring the ketone yielding material into simultaneous contact with the anode and the electrolyte. However it is often advantageous to employ porous structures to obtain a greater number of reaction sites per unit area.

The cell or cells may be operated at temperatures as low as room temperature and below, e.g., about 35° F., at atmospheric pressure to temperatures in the range of 300° F. to 400° F. when superatmospheric pressures are employed. It is preferred, however, to operate at temperatures in the range of about 75° F. to 250° F. and, more preferably, in the range of 120° F. to 185° F. Operation at atmospheric pressure eliminates the complexities inherent in designing and controlling a pressure resistant reactor but certain reaction rate advantages are to be obtained at elevated pressures, e.g., between 1 and 50 atmospheres. While temperatures below about 75° F. provide a clean, highly selective reaction, the rate of reaction is markedly decreased. Care must be exercized when operating in the higher temperatures mentioned, i.e., above 180° F., to control acid concentration and product removal to avoid excessive polymer formation, etc.

The concentration of the acid electrolyte in embodiments wherein a mixed hydrocarbon stream is continuously processed may range from about 2.5 to 12, preferably about 6.0 to 11.5, moles/liter. The choice within this range will be somewhat dependent upon the olefin employed and the reaction temperature employed. In one embodiment an acid concentration of about 9 to 10.5 moles/liter is preferred in the interest of accelerated rates of olefin absorption. In another embodiment a concentration in the range of about 2.5 to 5 moles $H_2SO_4$/liter is employed in the interest of accelerated rates of electrochemical oxidation.

Makeup water or water for dilution may be admitted to reactor 50 via conduit 61, valve 62 and conduit 60.

Ketone product, together with the much less reactive paraffins in the stream, may be removed from electrochemical reactor 50 with electrolyte via conduit 51 and passed to a product recovery unit 54 where the paraffins and ketone are separated from the electrolyte which is recycled to the reactor via conduit 58, valve 59 and conduit 60 to electrochemical reactor 50. The paraffins are separated from the ketone product and passed from the system via conduit 56. A crude ketone product which includes secondary butanol is passed via conduit 55 to a ketone finishing or purification unit, not shown. The secondary alcohol may be recycled either from unit 54 or the aforementioned finishing unit to the electrochemical reactor. In the alternative, electrochemical reactor 50 may be operated as aforementioned in the description of FIGURES 1 and 2 so as to remove the ketone product overhead as a gas or vapor stream via conduit 57 and thence to product recovery unit 54. In this embodiment the relatively unreactive paraffins pass overhead with the ketone and facilitate recovery of the ketone functioning as a stripping gas.

Product recovery unit may comprise singly or in combination any of the conventional liquid-vapor or liquid-liquid separation processes, e.g., distillation, extraction, etc., and this invention is not restricted to the employment of any particular product separation method.

When the process of this invention is carried out in an electrolytic cell that consumes electrical energy supplied from an outside source, the electrical energy supplied to the cathode is controlled so as to be insufficient to initiate oxygen evolution from the electrolyte so as to avoid undesirable side reactions. This will allow for a cathode potential of about 1.65 volts anodic with respect to standard hydrogen reference or slightly higher depending upon the acid concentration of the electrolyte and the process will ordinarily be carried out in the range of about 0.5 to 1.6 volts anodic to such reference. The process in the electrolytic cell is conducted so as not to effect any material change from the anodic half-cell reaction occurring when the process is carried out in a power-producing fuel cell.

In the choice of an olefin feedstock for use in the process of this invention, the highest selectivity to a single ketone product is obtained by employing the corresponding normal olefin. Thus propylene is employed for the production of acetone, butene-1 or butene-2 for producing methyl ethyl ketone, the n-pentenes for producing methyl propyl ketone and diethyl ketone, the n-hexenes for producing methyl butyl ketone and ethyl propyl ketone, etc. It is within the scope of this invention to preabsorb the olefin into the aqueous sulfuric acid solution external to the reactor so that the olefin feed and the acid electrolyte are admitted to the electrochemical reactor combined in a single solution. It is also within the scope of this invention to introduce the electrolyte and the olefin separately to the reactor as bypassing olefin gas into the electrolyte either within a zone in communication with the anode of the cell or within a separate compartment within the cell from whence the resulting solution may be circulated after contacting the anode. When the olefin feed is fed continuously to the cell as a separate stream, absorption will, of course, occur at the operating temperature of the cell, i.e., the electrolyte temperature. When the olefin is preabsorbed outside the cell, the absorption may be carried out at a temperature in the range of about 70° F. to 135° F., preferably 70° F. to 115° F. The temperature employed should take into consideration the acid concentration employed with the higher temperatures employed with the more dilute acid and vice versa. Excessive contact between olefin and acid should be avoided particularly at elevated temperatures and the time of contact prior to admission to the cell preferably is as short as effective extraction permits. When operated as a continuous process the ketone product may be removed from the cell as formed, and in the particular case of acetone production, should be removed as quickly as possible so as to avoid the buildup of acetone in the cell. With higher molecular weight ketones a much greater concentration of product can be tolerated within the cell without reducing the rate of electrochemical conversion, thus making possible more flexibility with regard to products recovery. For instance, in the production of methyl ethyl ketone from n-butylenes in accordance with this process ketone to olefin and/or alcohol ratios of 3/1 and higher do not adversely affect the reaction to any noticeable degree.

With normal modifications in accordance with molecular weight, solubility characteristics, etc. the process of this invention may be effectively carried out to produce a wide variety of ketones, e.g., $C_3$ to $C_{12}$ or higher. The process is particularly applicable to $C_4$ to $C_9$ aliphatic ketones. Various operational techniques may be employed to maintain the effectiveness of the process where the alcohol formed by hydrolysis of the absorbed olefin has a tendency to separate from the electrolyte. These include operation at elevated temperatures and pressures, control of acid concentration so that the alcohol solubility is increased with increased acid concentrations or so that the rate of hydrolysis is essentially equal to the electrochemical oxidation rate, thorough mixing of reactants and electrolyte via recycling, etc., and cell design.

In the production of certain higher molecular weight ketones by this process the ketone product will separate from the electrolyte forming a separate liquid phase. In such embodiments it is within the scope of this invention to remove such ketone from this separate liquid phase as a liquid side stream from the cell essentially free of electrolyte.

This invention will be more fully understood from the following examples which are for the purposes of illustration only and should not be construed as limitations upon the true scope of the invention as set forth in the claims.

*Example 1*

Ketones were produced electrochemically from a variety of olefin feedstocks in the following manner. Aqueous sulfuric acid electrolytes ranging in concentration from 0.5 to 12 moles $H_2SO_4$/liter were employed in a power driven electrolytic cell. The anode employed in such cell was a platinum sheet upon which platinum black had been electrodeposited while the cathode was a platinum wire screen. The source of power was rectified alternating current at an average potential of about 1 volt. In one embodiment electrolyte was placed in the cell and the olefin was admitted thereto as a gas. In another embodiment the olefin was preadsorbed in the electrolyte and admitted to the cell with the electrolyte. The gaseous effluent from the cell was continuously collected and after several hours operation this and the electrolyte were analyzed.

The following table sets forth the conditions and resulting product distribution obtained from the conversion of three representative olefins to the corresponding ketones. In these runs the olefin was admitted to the cell as a gas.

TABLE I

ELECTROCHEMICAL PRODUCTION OF KETONES FROM OLEFINS IN SINGLE STAGE PROCESS

| Reaction temp., °F | 180 | | |
|---|---|---|---|
| Conc. of electrolyte, moles $H_2SO_4$/liter | 8 | 10 | 10. |
| Olefin feedstock | Propylene | Butene-2 | Pentene-2. |
| Ketone product | Acetone | Methyl ethyl ketone. | Methyl propyl ketone. |
| Product Selectivity: | | | |
| To ketone, mole percent | >50 | >70 | >85. |
| To $CO_2$, mole percent | 22-30 | 8-18 | 8-10. |

This method of olefin feeding was compared with preadsorption of olefin in electrolyte employing butene-2 as the olefin feedstock. With acid strengths of 6-7 molar and lower preadsorption of olefin selectivity to $CO_2$ decreased markedly. With higher acid concentrations, e.g., 8-12 molar, the selectivity to MEK was high by both methods as shown in the following table.

TABLE II

ELECTROCHEMICAL PRODUCTION OF METHYL ETHYL KETONE FROM BUTENE-2 WITH PREADSORPTION AND GAS FEED INTO ELECTROLYTE OF OPERATING CELL

| Reaction temp., °F | 180 | |
|---|---|---|
| Conc. of electrolyte, moles $H_2SO_4$/liter | 6 | 10 |
| Effect of method of feeding of olefin on product dist.— | | |
| Preadsorption at 75° F.: | | |
| Selectivity to MEK, mole percent | >60 | >75 |
| Selectivity to $CO_2$, mole percent | 6-15 | 9-20 |
| Gas Feed to Electrolyte: | | |
| Selectivity to MEK, mole percent | >70 | >75 |
| Selectivity to $CO_2$, mole percent | 23-25 | 8-20 |

A separate oxidation was made with butene-2 and 10 molar $H_2SO_4$ to determine the effect of temperature on product selectivity. The reaction temperature employed was 120° F. The selectivity to MEK was slightly increased with a corresponding decrease in selectivity to $CO_2$.

The foregoing procedures were repeated in a fuel cell with simultaneous production of electrical energy by substituting a porous carbon cathode impregnated with about 1 wt. percent platinum and gold in a 95–5 wt. ratio and gaseous oxygen was passed through such electrode so as to form a three phase interface between electrode, electrolyte and oxygen. Product selectivity was not significantly changed as compared to the power driven cell.

Example II

To further demonstrate this invention additional runs were made in accordance with Example I except as herein stated; the conditions of such runs and the results obtained are set forth in the following table. The anode catalyst was platinum black for all runs.

Example III

Isobutylene was converted to acetone in accordance with the process of the preceding examples. The selectivity to ketone was not as great as with n-butylenes.

Example IV

Employing a processing unit in accordance with the flowplan of FIGURE 3 methyl ethyl ketone is produced from n-butylenes from a mixed $C_4$ hydrocarbon stream utilizing 65 wt. percent sulfuric acid to extract isobutylene from the stream at temperatures in the range of 70 to 100° F. in a three stage mixer-settler extraction unit. The unabsorbed portion of the hydrocarbon stream comprising n-butane, isobutane, and n-butylenes in a volume percent ratio of about 10/40/35 is passed directly to the electrochemical reactor to convert the n-butylenes to methyl ethyl ketone.

Separate runs are made employing acid concentrations in the electrolyte of the electrochemical reactor (fuel cells) of 25, 45 and 65 wt. percent $H_2SO_4$, respectively. The temperature of the reactor is operated in separate runs at 120°, 180° and 250° F.

In a run employing 5 wt. percent $H_2SO_4$ electrolyte and an operating temperature of 120° F. methyl ethyl ketone is produced and removed continuously from the cells as a bottoms stream with electrolyte secondary butanol, and butanes. This stream is passed to the product recovery unit and subjected to distillation to separate the butanes. A crude methyl ethyl ketone containing secondary butanol is passed to a ketone purification unit from whence the secondary butanol is separated and recycled to the electrochemical reactor. The electrolyte recovered from the aforementioned distillation is recycled from the aforementioned product recovery unit to the electrochemical reactor.

In another run the cell is operated at 180° F. with a 45 wt. percent $H_2SO_4$ electrolyte. Methyl ethyl ketone and butanes are recovered overhead and separated.

Example V

A $C_{12}$ ketone was produced from dodecene-1 in accordance with the process of the earlier examples using a platinum catalyst and introducing the olefin as a gas in a nitrogen stream to the electrolyte. The temperature of reaction was 180° F. and the electrolyte employed was 10 molar $H_2SO_4$.

Example VI

Methyl ethyl ketone was produced in an electrolytic cell, from butene-2, as in the preceding examples except that the electrolyte was 1 molar aqueous potassium hydroxide at 180° F. The olefin was fed as a gas to the cell. The anode was platinum catalyst. The average oxidation potential was 0.75 volts anodic to standard hydrogen reference.

TABLE III

ELECTROCHEMICAL PRODUCTION OF KETONES WITH DIFFERENT FEEDSTOCKS AND REACTION CONDITIONS IN ELECTROLYTIC REACTOR

| Olefin feedstock | (1) | (1) | (1) | (1) | (2) | (3) | (4) | (5) | (9) |
|---|---|---|---|---|---|---|---|---|---|
| Method of feeding olefin | (20) | (21) | (21) | (22) | (22) | (20) | (23) | (23) | (20) |
| Electrolyte conc., moles $H_2SO_4$/liter | 0.5 | 6 | 10 | 10 | 8 | 10 | 10 | 10 | 10 |
| Amps., avg | 0.048 | 0.0999 | 0.0831 | 0.078 | 0.046 | 0.061 | 0.021 | 0.0389 | 0.044 |
| Temperature, °F | 180 | 180 | 150 | 180 | 180 | 180 | 180 | 180 | 180 |
| Volts vs Std. $H_2$ ref., Avg | −0.87 | −0.74 | −0.89 | −0.88 | −1.44 | −1.06 | −1.32 | −1.64 | −1.69 |
| Load volts polarization vs std. $H_2$ ref | 0.93 | 0.69 | 0.79 | 0.78 | 1.36 | 0.96 | 1.22 | 1.54 | 1.59 |
| Ketone produced | (10) | (10) | (10) | (10) | (10) | (11) | (12) | (13) | (14) |
| Product selectivity to ketone | 18.3 | >75 | >70 | >80 | >50 | >90 | >13 | >9 | >9 |
| Reaction time, hrs | 70 | 90.8 | 42 | 24 | 24 | 21 | 10 | 72 | 72 |

[1] Butene-2.
[2] Butene-1.
[3] Pentene-2.
[4] Heptene-2.
[5] Hexene-2.
[6] Octene-2.
[10] $C_4$ Methyl ethyl ketone.
[11] $C_5$ Methyl propyl ketone.
[12] $C_7$ Ketone.
[13] $C_6$ Ketone.
[14] $C_8$ Ketone.
[20] Gas over surface of electrolyte.
[21] Gas bubbled through electrolyte.
[22] Preadsorbed at 75°F.
[23] Preadsorbed at 120°F.

The term "anodic oxidation" as employed herein shall be understood to include anodic dehydrogenation.

The terms "electrochemical cell" and "electrochemical reactor" as employed herein shall be construed to include both power-generating fuel cells as hereinbefore defined and electrolytic cells which are driven by an external source of direct electrical current.

What is claimed is:

1. A process for producing a ketone by converting the corresponding normal olefin of a hydrocarbon mixture containing said olefin in admixture with paraffins and isoolefins having the same number of carbon atoms as said normal olefin which comprises contacting said hydrocarbon mixture with a first aqueous sulfuric acid solution under conditions at which said isoolefins are selectively absorbed, separating the resulting isoolefin-acid extract from said paraffin and said normal olefin, passing said paraffin and said normal olefin in gaseous form into an absorption zone containing aqueous sulfuric acid solution having a concentration of about 6 to 11.5 moles $H_2SO_4$ per liter, separating a normal olefin-acid extract containing about 2.5 to about 5 moles $H_2SO_4$ per liter with a resultant formation of the corresponding alcohol therein, passing said extract to an electrolytic cell containing a platinum comprising anode, maintaining an oxidation potential at said anode insufficient to effect oxygen evolution at said anode and in the range of about 0.5 to about 1.65 volts anodic to standard hydrogen reference, at a temperature in the range of about 120° to 250° F., thereby electrolytically dehydrogenating said alcohol to said ketone removing said ketone in a ketone and sulfuric acid comprising product stream from said cell, separating an acid comprising stream from said product stream and recovering said ketone.

2. A process in accordance with claim 1 wherein said normal olefin-acid extract is formed at an elevated temperature.

3. A process in accordance with claim 2 wherein said temperature is in the range of about 70° to 135° F.

4. A process in accordance with claim 1 wherein the concentration of acid in said absorption zone prior to contact with said olefin is in the range of about 9 to 10.5 moles per liter, said normal olefin is a $C_4$ olefin, and the temperature of reaction is between 120° and 185° F.

5. A continuous process in accordance with claim 1 wherein said acid comprising stream has a sulfuric acid concentration within the range of the acid concentration then present in said absorption zone and is recycled directly to said absorption zone.

6. A continuous process in accordance with claim 1 wherein said acid comprising stream contains said alcohol and said stream is recycled to said cell.

References Cited by the Examiner
UNITED STATES PATENTS

| | | | |
|---|---|---|---|
| 1,365,053 | 1/1921 | Ellis et al. | 204—80 |
| 2,384,463 | 9/1945 | Gunn et al. | 136—86 |
| 2,981,767 | 4/1961 | Gay et al. | |

JOHN H. MACK, *Primary Examiner.*

JOHN R. SPECK, WINSTON A. DOUGLAS,
*Examiners.*